United States Patent
Timac et al.

(10) Patent No.: US 9,879,369 B2
(45) Date of Patent: Jan. 30, 2018

(54) BALANCE WEIGHT CONNECTION SCREW

(71) Applicant: ARCELIK ANONIM SIRKETI, Istanbul (TR)

(72) Inventors: Gokhan Timac, Istanbul (TR); Sabih Hizal, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 15/341,931

(22) Filed: Nov. 2, 2016

(65) Prior Publication Data

US 2017/0045078 A1 Feb. 16, 2017

Related U.S. Application Data

(63) Continuation of application No. 13/884,942, filed as application No. PCT/EP2011/069478 on Nov. 4, 2011.

(30) Foreign Application Priority Data

Nov. 10, 2010 (TR) .............................. A 2010/09344

(51) Int. Cl.
| | |
|---|---|
| *F16B 43/00* | (2006.01) |
| *D06F 37/26* | (2006.01) |
| *F16F 15/22* | (2006.01) |
| *F16B 39/26* | (2006.01) |
| *F16B 41/00* | (2006.01) |

(52) U.S. Cl.
CPC ............ *D06F 37/262* (2013.01); *F16B 39/26* (2013.01); *F16F 15/22* (2013.01); *F16B 41/002* (2013.01)

(58) Field of Classification Search
CPC ......... D06F 37/262; F16B 39/26; F16B 15/22

USPC .......................................................... 411/533
See application file for complete search history.

(56) References Cited

U.S. PATENT DOCUMENTS

| | | | | |
|---|---|---|---|---|
| 2,192,322 A | * | 3/1940 | Mitchell ................. | F16B 39/26 411/165 |
| 2,227,464 A | * | 1/1941 | Olson ..................... | F16B 39/26 411/165 |
| 2,283,494 A | * | 5/1942 | Erdman .................. | B21H 3/06 411/157 |

(Continued)

FOREIGN PATENT DOCUMENTS

| | | |
|---|---|---|
| DE | 7128124 U | 8/1972 |
| DE | 4238686 C1 | 3/1994 |

(Continued)

OTHER PUBLICATIONS

International Search Report and Written Opinion, dated Feb. 20, 2012, of corresponding International Application No. PCT/EP2011/069478; 7 pgs.

*Primary Examiner* — Gary Estremsky
(74) *Attorney, Agent, or Firm* — Kilpatrick Townsend & Stockton LLP

(57) ABSTRACT

The present invention relates to a screw providing a balance weight to be secured to a household appliance, for example a washing machine, in prestressed manner, having a head providing the screwing operation to be performed by being rotated, mounted with a spring washer on the lower side, and a shank extending under the head having a threaded portion thereon, a cylindrical shoulder disposed on the part of the screw where the shank joins with the head, with a diameter greater than that of the shank.

5 Claims, 4 Drawing Sheets

(56) References Cited

U.S. PATENT DOCUMENTS

Figure 1:
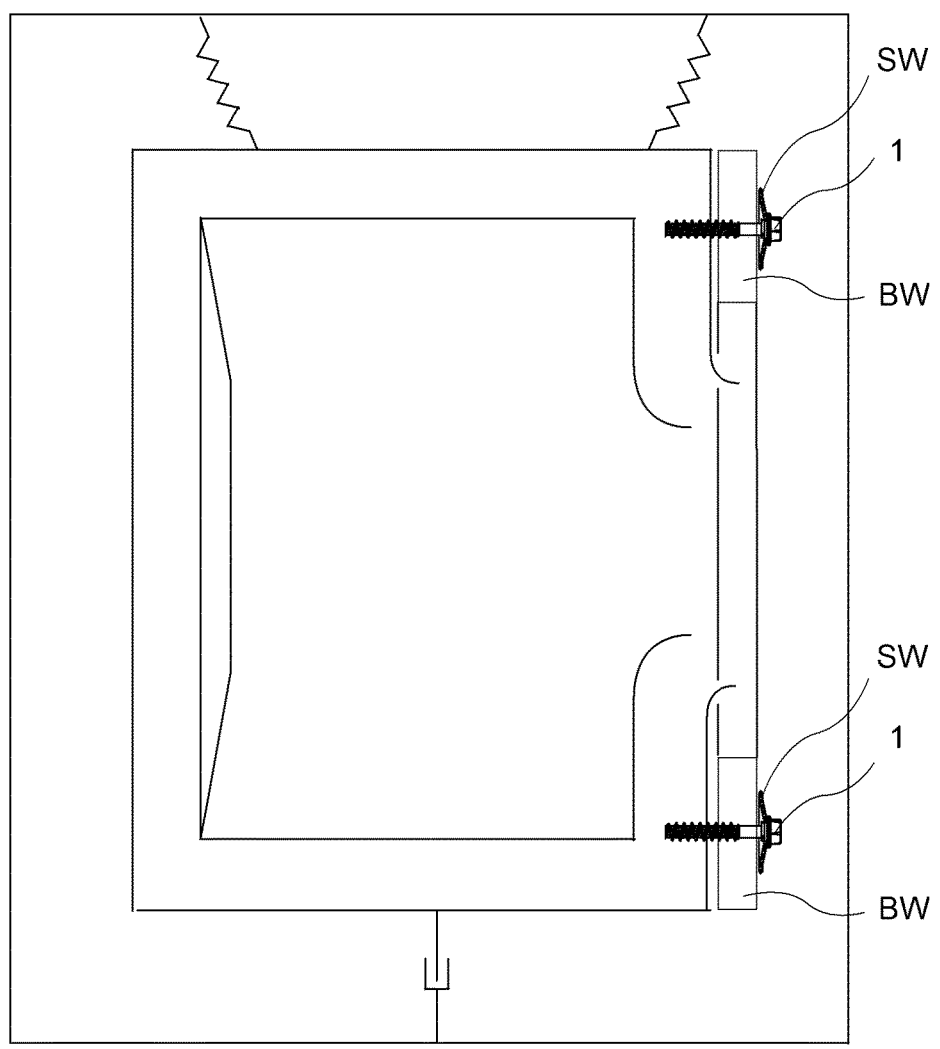

| | | | | | |
|---|---|---|---|---|---|
| 2,366,869 | A | * | 1/1945 | Olson | F16B 39/26 |
| | | | | | 411/134 |
| 2,391,308 | A | * | 12/1945 | Hanneman | B21H 3/022 |
| | | | | | 411/134 |
| 2,713,883 | A | * | 7/1955 | Poupitch | F16B 39/26 |
| | | | | | 411/134 |
| 4,204,566 | A | * | 5/1980 | Kirrish | F16B 39/26 |
| | | | | | 411/324 |
| 4,238,165 | A | * | 12/1980 | Wagner | F16B 39/26 |
| | | | | | 403/408.1 |
| 4,292,007 | A | * | 9/1981 | Wagner | F16B 39/26 |
| | | | | | 411/156 |
| 4,462,730 | A | * | 7/1984 | Knohl | F16B 35/048 |
| | | | | | 411/371.1 |
| 5,308,285 | A | * | 5/1994 | Malen | B21H 3/02 |
| | | | | | 411/368 |
| 6,318,939 | B1 | * | 11/2001 | Avaux | E01B 9/10 |
| | | | | | 411/153 |
| 6,364,689 | B1 | * | 4/2002 | Urso | H01R 4/2408 |
| | | | | | 411/533 |

FOREIGN PATENT DOCUMENTS

| | | |
|---|---|---|
| EP | 1834025 A1 | 9/2007 |
| GB | 736480 A | 9/1955 |
| JP | 2283910 A | 11/1990 |

\* cited by examiner

BALANCE WEIGHT CONNECTION SCREW

This application is a continuation of U.S. application Ser. No. 13/884,942 which is a U.S. National Phase of International Application No. PCT/EP2011/069478, filed Nov. 4, 2011, claiming priority to Turkish Patent Application No. A 2010/09344, filed Nov. 10, 2010, all the entries of which are hereby incorporated by reference.

The present invention relates to a screw used in the connection of balance weights utilized in household appliances.

Balance weights are used in order to decrease vibrations generated during the operation of household appliances like the washing machine, the dishwasher or the oven. For example in washing machines, especially in the spin-drying step wherein the drum is rotated at high speeds, the unbalanced load resulting from the laundry and structural factors increases vibration and noise, and cause the washing machine to wear out. Furthermore, the spin-drying performance of the washing machine is adversely affected. In the state of the art, connecting balance weights, produced from heavy materials like concrete or metal, to the tub wherein the washing process is performed for balancing unbalanced load is a widely implemented method. The tub of the washing machine is generally produced from plastic material and the mechanical strength of plastic material is considerably lower than metal material. The balance weights are mounted to the plastic tub by screwing and damage occurs in the plastic bosses, providing connection of the balance weight to the tub, as a result of too much load and vibration. The screw connection points at the plastic tub become damaged due to reasons such as over-tightening of the screw, particularly during the production in automatic workbenches. Furthermore, the balance weight connection screw is screwed to the tub by automatic screwing machines by being previously grouped with the spring washer in order to provide a prestressed connection. Errors can occur in the grouping process of the spring washer with the connection screw, the spring washer may not stay in the desired position on the screw, be dislodged and problems occur in the automatic screwing process.

In the European Patent Application No. EP1834025, a connection mechanism utilized in washing machines is explained, which comprises a spring washer providing the balance weight that assists to attenuate the forces applied during the operation by increasing the inertia of the washing tank to be attached to the washing tank as gap-free, which compensates the time-dependent loosening during the operation and which prevents the noise level from increasing which may be caused as the balance weight detaches from its fixed position.

In the German Patent No DE4238686, in the balance weight connection used in a washing machine, the connection of the plastic screw with the spring washer is explained so as to prevent loosening of plastic material due to elastic deflection in the course of time. A prestress is formed as the spring washer stretches in the axial direction.

The aim of the present invention is the realization of a screw, used in connecting balance weights to household appliances and which is suitable for automation in production.

The screw realized in order to attain the aim of the present invention, explicated in the first claim and the respective claims thereof, used together with a spring washer in pre-stressed manner for connecting balance weights to the household appliances like the washing machine, comprises a cylindrical shoulder disposed right below the head portion, having a diameter wider than the screw diameter and whereon the spring washer is borne loose fittingly on the lateral surface and protuberances projecting outward from the lateral surface of the shoulder, thus increasing width of the shoulder, which are formed by pounding the lower surface of the shoulder or by opening indentations after the spring washer is fitted.

After the screw is grouped with the spring washer, indentations are opened on the lower surface of the shoulder below the screw head by impacting with a conical tipped device and these indentations form the protuberances by pushing the edge portion outwards wherein the lateral surface of the shoulder joins with the lower surface. While the lower surface of the shoulder is pounded inwards by means of the indentations, the protuberances push the lower portion of the lateral surface of the shoulder near the edge outwards. Since the spring washer is previously loosely fitted on the lateral surface of the shoulder, the protuberances prevent the spring washer from being dislodged out of the shoulder, in other words from the screw. Consequently, in automatic production, the spring washer and the screw are prevented from being grouped erroneously before the screwing process.

In an embodiment of the present invention, the screw comprises protuberances the surface whereon the spring washer is seated of which is round. In this embodiment, indentations are made on the lower surface of the shoulder by a special apparatus having a roundly shaped tip, creating rounded protuberances towards the outside from the lateral surface. The round protuberances considerably decrease the contact surface between the spring washer and the screw, hence the friction force, thereby preventing the spring washer and the screw from rotating together in the automatic screwing process.

In another embodiment of the present invention, protuberances are formed on the screw, such that there is a distance between the protuberances and the screw head, that is greater than the wall thickness of the spring washer and thus that provides the spring washer to rotate freely around its axis.

The protuberances formed by pounding or making indentations at the lower surface in the spring washer shoulder at the screw, provide the spring washer to be kept at the right position together with the screw before screwing process and during screwing process of the balance weight and any additional components are not needed to be used for holding the spring washer on the screw.

The balance weight connection screw realized in order to attain the aim of the present invention is illustrated in the attached figures, where:

FIG. 1—is the schematic view of a washing machine wherein the balance weight is connected with connection screws.

Figure 2:
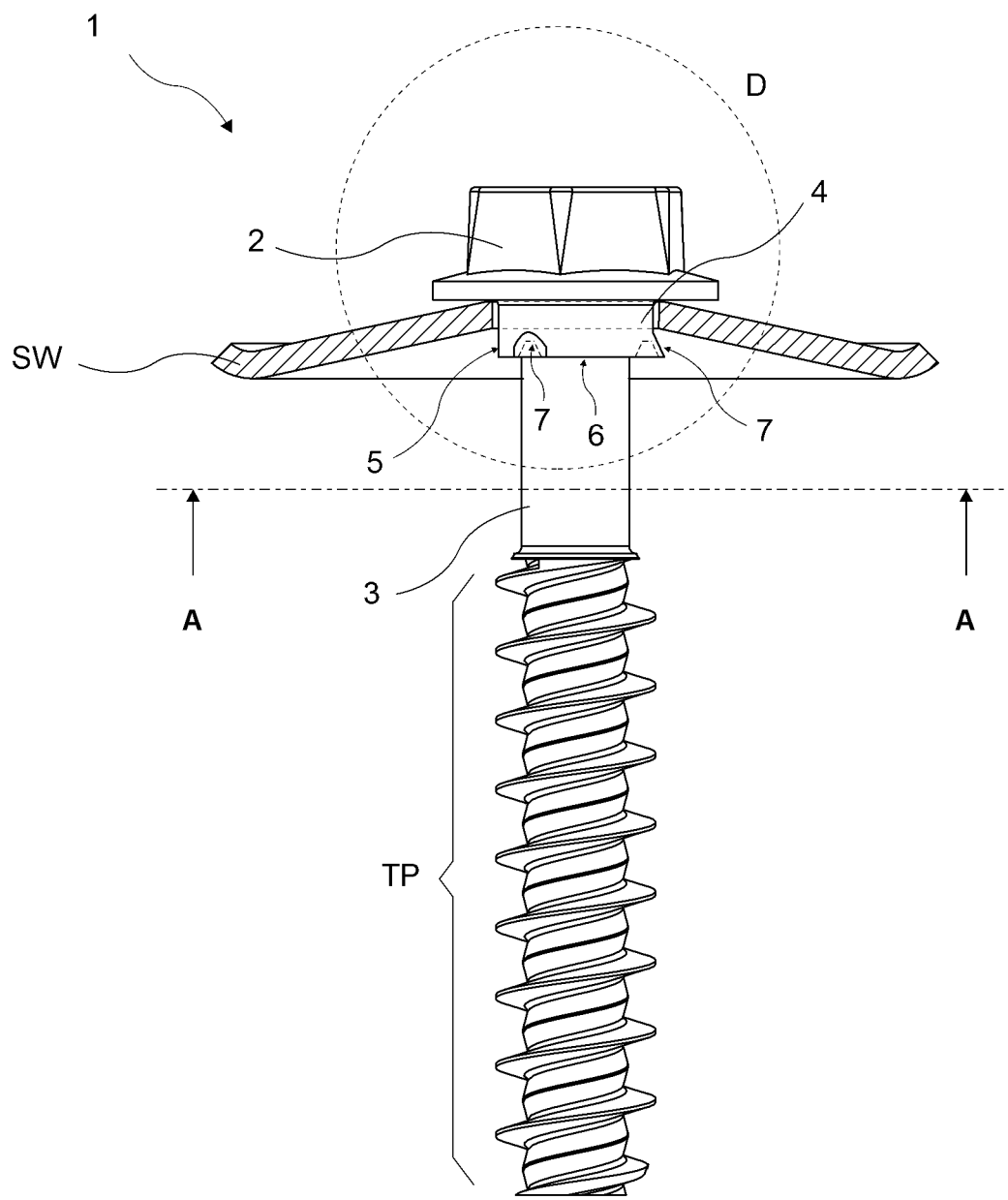

FIG. 2—is the front view of the connection screw grouped with a spring washer.

Figure 3:
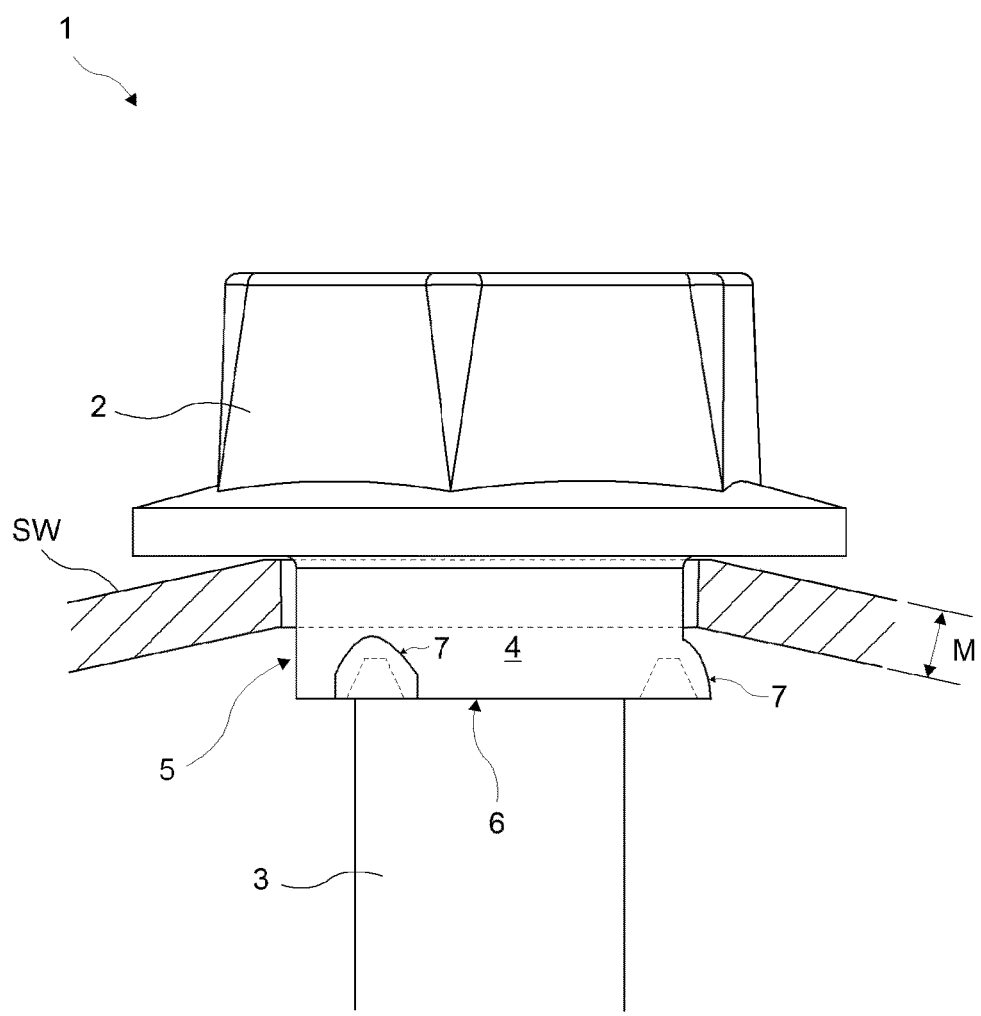

FIG. 3—is the view of detail D in FIG. 2.

Figure 4:
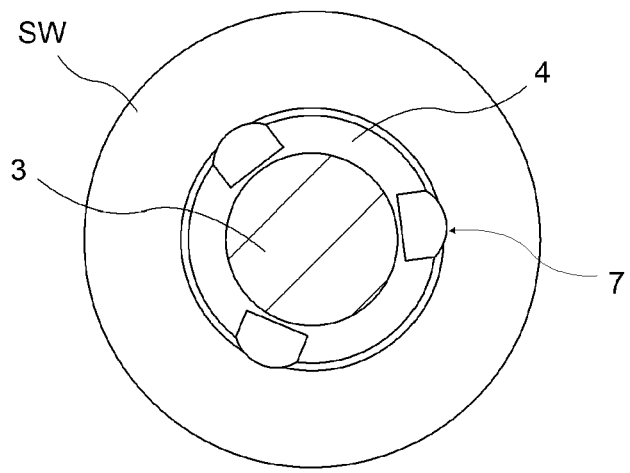

FIG. 4—is the view of the cross-section A-A in FIG. 2.

Figure 5:
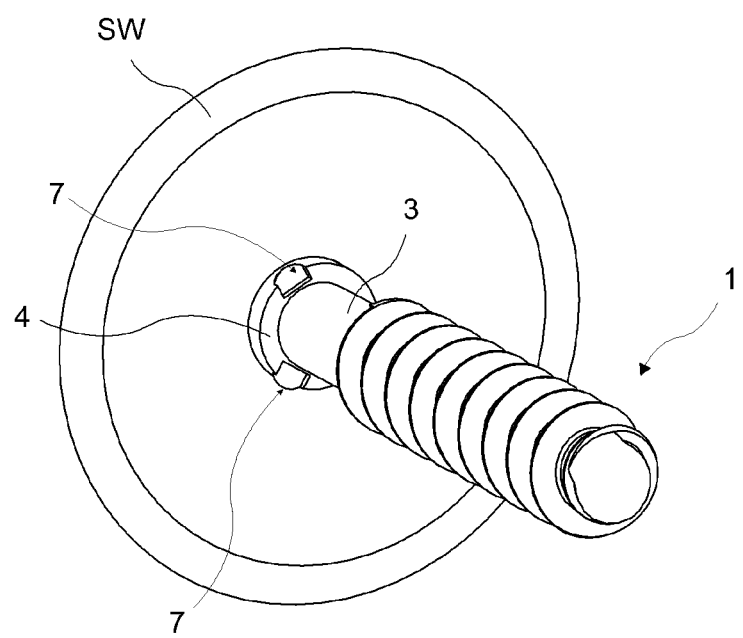

FIG. 5—is the perspective view of the connection screw grouped with a spring washer.

The elements illustrated in the figures are numbered as follows:

1. Screw
2. Head
3. Shank
4. Shoulder

5. Lateral surface
6. Lower surface
7. Protuberance
BW: Balance weight
SW: Spring washer
TP: Threaded portion
M: Spring washer wall thickness The screw (1) grouped with a spring washer (SW), suitable for using in the balance weight (BW) connection in household appliances, for example in washing machines, comprises a preferably flanged head (2), providing the screwing operation to be performed by being rotated, and a shank (3) extending under the head (2) having a threaded portion (TP) thereon. The spring washer (SW) is placed between the head (2) and the balance weight (BW), the head (2) stretches the spring washer (SW) by exerting pressure thereon during the screwing process, thus the balance weight (BW) is secured to the household appliance in prestressed manner.

The screw (1) of the present invention comprises a cylindrical shoulder (4) disposed on the part of the screw (1) where the shank (3) joins with the head (2), with a diameter wider than that of the shank (3) and whereon the spring washer (SW) is fitted, a lateral surface (5) where the spring washer (SW) is borne loose-fittingly on the shoulder (4), a planar lower surface (6) situated at the lower side of the shoulder (4) facing the shank (3) and at least one protuberance (7) projecting outwards from the lateral surface (5), formed in the lateral surface (5) by opening indentations on the lower surface (6) or by pounding to deform the lower surface (6) after the spring washer (SW) is fitted to the shoulder (4).

In grouping process of the spring washer (SW) with the screw (1), first the spring washer (SW) is mounted to the shoulder (4) and afterwards the lower surface (6) of the shoulder (4) is deformed by opening indentations or by pounding. The indentations or the poundings made on the lower surface (6) form protuberances (7) that project out from the region bordered by the lateral surface (5) near the joining edge of the lateral surface (5) with the lower surface (6). The protuberances (7) widen the shoulder (4) near the joining edge of the lateral surface (5) so as to be greater than the diameter of the hole in the middle of the spring washer (SW), thus preventing dislodging of the spring washer (SW) from the shoulder (4).

The indentations or poundings formed at the lower surface (6) of the shoulder (4) form the protuberances (7) by pushing outwards the portion near the joining edge of the lateral surface (5) with the lower surface (6). In other words, the protuberances (7) formed by deforming the lower surface (6) with indentations or poundings, project outwards from the lateral surface (5). Since the spring washer (SW) is previously loosely fitted on the lateral surface (5), the protuberances (7) prevent the spring washer (SW) from dislodging from the lateral surface (5), that is from the shoulder (4).

In an embodiment of the present invention, the screw (1) comprises protuberances (7) with a rounded surface against which the spring washer (SW) bears (FIG. 3). In this embodiment, indentations are made on the lower surface (6) of the shoulder (4) by a special apparatus having a roundly shaped tip, creating rounded protuberances (7) towards the outside from the lateral surface (5). The rounded protuberances (7) provide the spring washer (SW) to stay fixed on the balance weight (BW) whereon it is seated and also the screw (1) to rotate at the center of the spring washer (SW), without rotating the spring washer (SW). The rounded protuberances (7) considerably decrease the contact surface between the spring washer (SW) and the screw (1) thus the friction force between the spring washer (SW) and the screw (1), and prevent the spring washer (SW) and the screw (1) from rotating together. Consequently, during the screwing process, the balance weight (BW) connection is realized, that is provided with the desired torque and screw (1) rotation number values and that is prevented from loosening in a short while.

In another embodiment of the present invention, in the screw (1) there is a distance between the protuberances (7) and the head (2), greater than the wall thickness (M) of the spring washer (SW) and accordingly providing the spring washer (SW) to freely rotate around its axis (FIG. 3). The protuberances (7) only prevent the spring washer (SW) from dislodging from the shoulder (4), the spring washer (SW) can easily rotate around its axis even after being fitted on the shoulder (4) and the protuberances (7) are formed. In other words, the spring washer (SW) is not locked in between the protuberances (7) and the head (2), movement margin is left for the spring washer (SW) by means of the said protuberance (7)—head (2) distance on the shoulder (4).

In another embodiment of the present invention, the screw (1) comprises three protuberances (7) on the lower surface (6) equally spaced apart all around (with 120 degree angles), thus the spring washer (SW) is held from below in balanced manner on the screw (1) as per the plane principle defined by three points, production errors are avoided by means of the spring washer (SW) remaining in the correct position during the automatic screwing process of the balance weight (BW).

In the connection process of the balance weight (BW) by the automatic screwing machine, the spring washers (SW), grouped so as not to dislodge from the screws (1) by means of the screws (1) and the protuberances (7), proceed in the production line and the automatic screwing machine holds and brings the screw (1) and spring washer (SW) to the balance weight (BW) screwing position, presses the spring washer (SW) to the balance weight (BW) and rotates the head (2) thereby performing the screwing process. In the screwing process, the spring washer (SW) stretches by bearing against the balance weight (BW) and thus the balance weight (BW) is connected to the household appliance in prestressed manner. The protuberances (7) hold the spring washer (SW) on the screw (1) in a balanced position before the screwing process and during the screwing process thus preventing production errors from occurring.

In the balance weight (BW) connection screw (1), the protuberances (7) formed on the lateral surface (5) by opening indentations or by pounding the lower surface (6) of the shoulder (4) un necessitates additional components for holding the spring washer (SW) on the screw (1) during production by automatic screwing machines, thus providing savings in the number of elements used.

It is to be understood that the present invention is not limited by the embodiments disclosed above and a person skilled in the art can easily introduce different embodiments. These should be considered within the scope of the protection postulated by the claims of the present invention.

The invention claimed is:

1. A screw suitable for use in the balance weight connection in household appliances, by being grouped with a spring washer, comprising:
    a head, providing the screwing operation to be performed by being rotated,
    a shank extending under the head having a threaded portion thereon, a cylindrical shoulder disposed on the part of the screw where the shank joins with the head, the cylindrical shoulder having:
  a diameter greater than that of the shank and whereon the spring washer is mounted,
  a lateral surface where the spring washer is borne loose-fittingly on the shoulder,
  a planar lower surface situated at a lower part of the shoulder facing the shank,
the planar lower surface joining the lateral surface to form a joining edge, and
at least one protuberance formed on the lateral surface of the cylindrical shoulder by deforming the planar lower surface after the spring washer is mounted to the shoulder, projecting outward from the lateral surface such that the at least one protuberance widen the shoulder at the joining edge.

2. A screw as in claim 1, wherein the at least one protuberance includes a rounded surface, the spring washer bears against the rounded surface of the at least one protuberance.

3. A screw as in claim 1, wherein a distance between the at least one protuberance and the head is greater than a wall thickness of the spring washer thereby providing the spring washer to freely rotate around its axis.

4. A screw as in claim 1, wherein three protuberances are arranged at regular intervals along the edge of the lower surface all around.

5. A washing machine wherein the balance weight is connected by using a screw as in claim 1.

* * * * *